United States Patent [19]
Holtz

[11] 4,013,014
[45] Mar. 22, 1977

[54] CIRCUIT ARRANGEMENT FOR A TRACK-BOUND PROPULSION VEHICLE

[75] Inventor: Joachim Holtz, Erlangen, Germany

[73] Assignee: Siemens Aktiengesellschaft, Munich, Germany

[22] Filed: Sept. 3, 1975

[21] Appl. No.: 610,054

[30] Foreign Application Priority Data

Sept. 18, 1974 Germany .................... 2444679

[52] U.S. Cl. .................... 104/148 LM; 310/13; 318/38; 318/135
[51] Int. Cl.² ......................................... H02P 7/46
[58] Field of Search ............. 104/148 LM, 148 MS, 104/148 SS, 149, 152, 153; 246/182 B, 187 B; 318/687, 135, 38, 91, 113; 310/12–13; 335/219

[56] References Cited
UNITED STATES PATENTS

| | | | |
|---|---|---|---|
| 2,041,607 | 5/1936 | Hopkins | 104/153 |
| 2,404,984 | 7/1946 | Powers | 104/148 LM |
| 3,158,765 | 11/1964 | Polgreen | 104/148 LM |
| 3,803,466 | 4/1974 | Starkey | 104/148 LM |
| 3,874,301 | 4/1975 | Alimanestiana | 104/152 |
| 3,912,992 | 10/1975 | Lamb | 318/135 |

*Primary Examiner*—Trygve M. Blix
*Assistant Examiner*—Galen L. Barefoot
*Attorney, Agent, or Firm*—Kenyon & Kenyon Reilly Carr & Chapin

[57] ABSTRACT

The invention relates to a circuit arrangement for use with a trackbound propulsion vehicle. The circuit arrangement includes a traveling-field winding which is installed alongside the vehicle roadbed and forms the stator of a linear synchronous motor whose exciter is disposed as a co-movable translator on the vehicle itself. More particularly, in order to be able to accelerate the propulsion vehicle with constant driving power, in accord with the invention, the traveling-field winding is designed such that the number of conductors per pole and phase thereof are inversely proportional to a pre-determined vehicle velocity.

7 Claims, 10 Drawing Figures

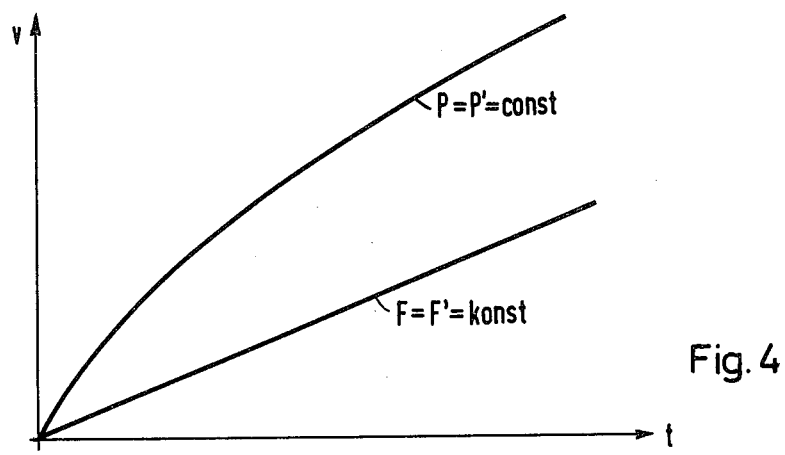
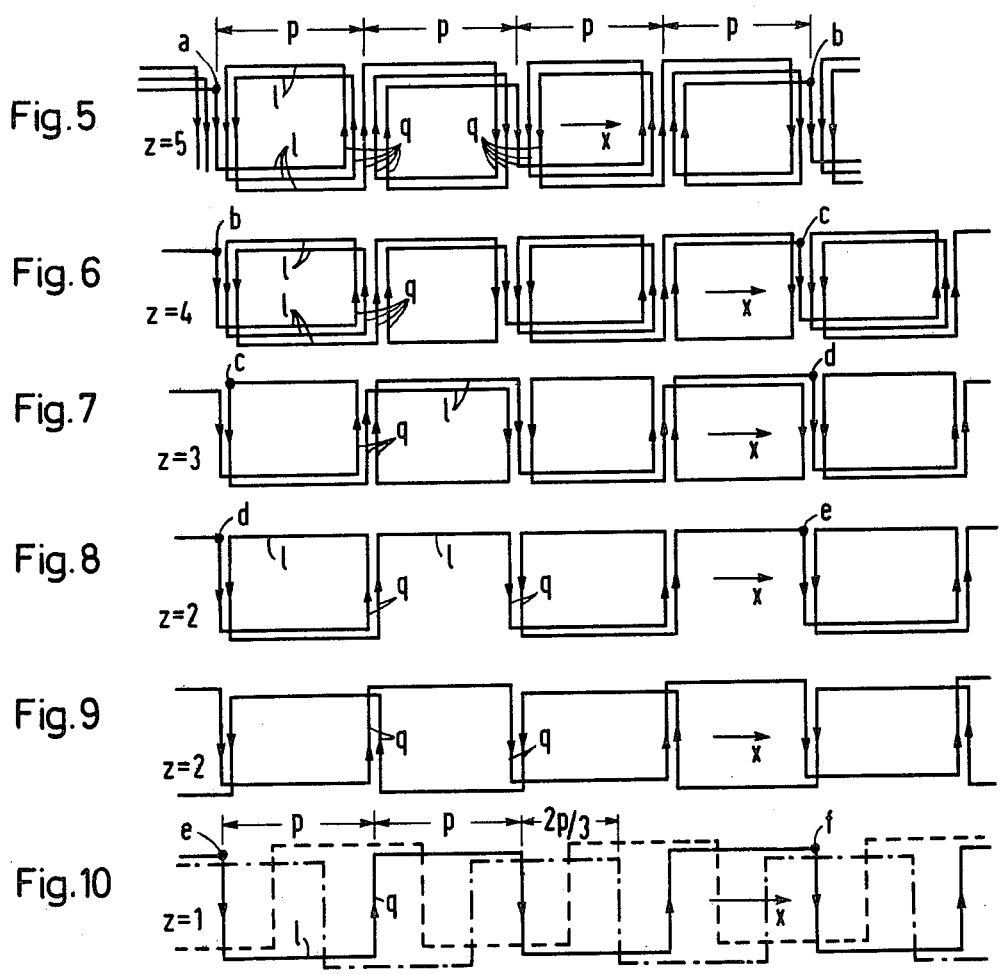

CIRCUIT ARRANGEMENT FOR A TRACK-BOUND PROPULSION VEHICLE

BACKGROUND OF THE INVENTION

1. Field of the Invention

The invention relates to a circuit arrangement for use with a trackbound propulsion vehicle. More particularly, it relates to a traveling-field winding which is installed alongside the vehicle roadbed and forms the stator of a linear synchronous motor whose exciter is disposed as a co-movable translator on the vehicle itself.

Linear motors merit preferential consideration as drive systems for trackbound propulsion vehicles, as for example, cabin cars in local traffic and high-speed trains, as well as for magnetic suspension vehicles, such as high-efficiency, high-speed trains in the speed range of up to 500 km/h. Among the various variants of this type of motor, the linear synchronous motor is particularly noted for its good efficiency and high power factor.

More specifically, the stator of such a linear synchronous motor may typically be designed as a traveling-field winding which is installed alongside the vehicle roadbed and which is generally polyphase in nature (see, for example, Archiv fur Elektrotechnik, vol. 55, No. 1 (1972) p. 13/20). The exciter of the motor, on the other hand, is generally disposed on the propulsion vehicle itself as a co-movable exciter (translator) and can be either a dc-fed exciter winding which may extend over the entire length of the vehicle, or a permanent magnet. Because of the extraordinary length of the motor stator, such a motor is also called a synchronous long-stator motor.

In response to an applied voltage and frequency, the traveling-field winding of the motor generates a traveling-field which runs in the longitudinal direction of the roadbed and drives the propulsion vehicle. In order for the linear synchronous motor to properly accelerate such a trackbound propulsion vehicle from standstill to a specified maximum speed, the stator is provided, in the area of each vehicle stopping station, with an acceleration span which has a predetermined number of feeding sections disposed one behind the other in the travel direction and which are referred to as the acceleration sections of the stator. Each acceleration section is supplied by a separate converter with a variable ac voltage and frequency. Advantageously, these acceleration sections are operated at a high current density so as to obtain large accelerations of about 0.1 g (g = gravity acceleration). A corresponding procedure is followed to decelerate the propulsion vehicle from its maximum speed to a stop.

It is an object of the present invention to design the above-mentioned type of propulsion vehicle circuit arrangement so as to make it possible to accelerate or decelerate the propulsion vehicle at a high acceleration or deceleration rate and with good matching of the power fed into or supplied by the respective acceleration sections to the rated capacity of their respective converters.

SUMMARY OF THE INVENTION

In accordance with the principles of the present invention, the above and other objectives are accomplished in a circuit arrangement of the above-described type by modifying the stator (i.e., the traveling-field winding) included therein such that at least one acceleration section of the stator is divided into a number of interconnected subsections through all of which flow the current supplied by the converter associated with that acceleration section. More particularly, in accord with invention, the transversal conductors per pole and the phase in these subsections, as viewed in the direction of positive acceleration, decreases in an inversely proportional manner to the predetermined vehicle velocity in these subsections.

In designing the cicuit arrangement in the above manner, a location-dependent matching of the power of the linear synchronous motor comprising the stator to that of the converters feeding the motor is realized. As a result, at a given rated converter capacity, a particularly high acceleration of the vehicle can be achieved for starting and/or braking. This, in turn permits a shorter length and/or smaller number of acceleration sections to be used and, in addition, reduces the economically justifiable distance between which two neighboring vehicle station stops can be located. Moreover, the feeding converter is now utilized to the optimum when accelerating and/or decelerating, since the power matching is arranged so that the supply power approximately equals the rated capacity of the converter.

It is further advantageous in the present circuit arrangement to connect the transversal conductors of adjacent poles in each subsection so that all transversal conductors are engaged during the advance in the acceleration direction. With such interconnection, a transition from one subsection to the next subsection having a greater or smaller number of transversal conductors can be made in a simple manner.

Also, advantageously, the circuit arrangement is designed such that the propulsion vehicle experiences a largely jolt-free transition between two adjacent feeding sections of the stator traveling-field winding. If the adjacent feeding sections are from two adjacent acceleration sections both of which are divided into subsections, then the neighboring subsections of the two adjacent acceleration sections should, to realize a jolt-free transistion, have the same number of conductors per pole and phase, or their respective number of conductors should differ by only 1. A particularly simple and advantageous arrangement of the transversal conductors is realized when the number of transversal conductors per pole and phase decreases by 1 from subsection to subsection. This also permits a particularly simple design of the transition between subsections of different acceleration sections.

It is also advantageous, in practice, to limit the number of transversal conductors per pole and phase so as to not exceed 10 in that particular subsection of an acceleration section in which the highest vehicle velocity is attained as compared to the other subsections. In many cases, the latter number will be near 5. The number of acceleration sections may also be smaller than 5.

BRIEF DESCRIPTION OF THE DRAWINGS

The above and other features and aspects of the present invention will become more apparent upon reading the following detailed description in conjunction with the accompanying drawings, in which:

FIG. 4 shows a diagram in which, during an acceleration process, the vehicle velocity $v$ is plotted as a function of time $t$, both for the case of constant maximal driving power P' and the case of constant maximal thrust F'; and FIGS. 5 to 10 are top views of possible winding arrangements for one phase of a subsection for various numbers of conductors per pole.

DETAILED DESCRIPTION

Figure 1:
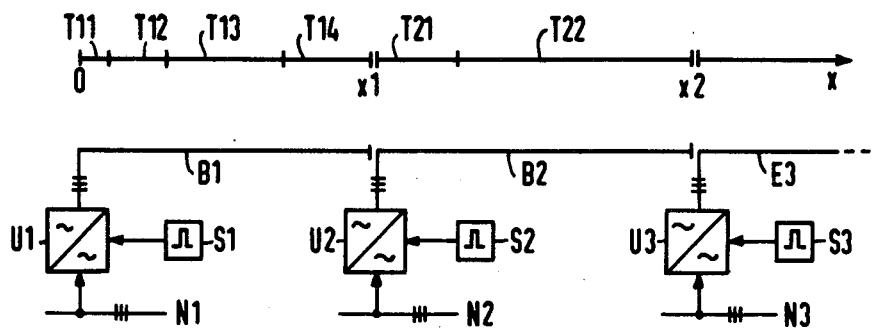
FIG. 1 shows a schematic representation of a circuit arrangement in accordance with the invention comprising two converter-fed acceleration sections for use with a trackbound propulsion vehicle.

In FIG. 1 a part of a traveling-field winding is disposed along a position reference axis $x$. The aforesaid traveling-field winding is assumed to be installed along a roadbed defined by the axis $x$ and forms part of a linear synchronous motor for use in driving a trackbound propulsion vehicle (not shown) which may, for example, be a magnetic suspension vehicle. Because of the great length of the traveling-field winding, the linear motor is also called a synchronous long-stator motor. The exciter (translator) of the linear synchronous motor may take the form of a dc-fed exciter winding or a permanent magnet and is disposed on the propulsion vehicle.

By means of the linear synchronous motor, the propulsion vehicle is to be accelerated at a high acceleration rate from standstill (vehicle velocity $v = 0$) at the vehicle location $x = 0$ to a specified maximum velocity $v_m$ at the vehicle location $x = x2$. The desired curve of the vehicle velocity $v$ as a function of the vehicle location $x$ is shown schematically in the diagram of FIG. 2 for the acceleration process. The shape of the curve of FIG. 2 depends on the rated capacity of the converters U1, U2.

For acceleration, an acceleration span or distance is provided to the right of the vehicle station stop, which is assumed to be at the vehicle location $x = 0$. In the present illustrative case, the acceleration span comprises a number $k = 2$ of acceleration sections B1 and B2, located one behind the other along the vehicle travel direction (i.e., the $x$ axis). The number $k$ may also be greater or smaller than 2. Each acceleration section B1, B2 comprises a portion of the traveling-field winding and is supplied with an ac voltage derived from a separate converter U1 and U2, respectively. The amplitude and frequency of the aforesaid ac voltage may be varied by means of respective control units S1 and S2. The converters U1 and U2, in turn, are fed by a power system N1 and N2, respectively, each which may be three-phase.

Figure 2:
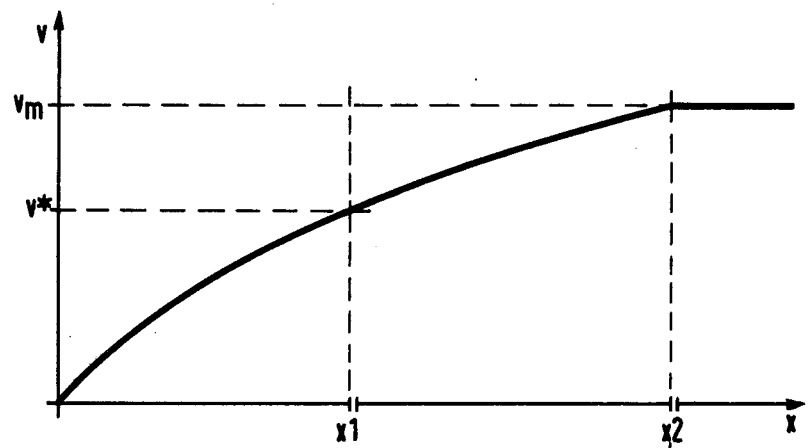
FIG. 2 illustrates a curve of the desired vehicle velocity of the vehicle of FIG. 1 as a function of the vehicle location.

Adjoining the acceleration span, which extends from the vehicle location $x = 0$ to the vehicle location $x = x2$, is a travel or cruising section or span E3 in which the propulsion vehicle is operated at constant maximum velocity $v_m$. This maximum velocity $v_m$ is shown in the diagram of FIG. 2. The travel section E3 also comprises a portion of the traveling-field winding and is fed by a separate converter U3 connected to another three-phase power system N3. The converter U3 is controlled by a control unit S3 so as to provide an ac voltage of constant frequency and amplitude. The travel section E3 may be followed by other travel sections of similar construction.

The acceleration sections B1, B2, which may be of different lengths, and the travel section E3 are preferably designed for three-phase operation. This is indicated by the three slanted lines at the output of the converters U1, U2, U3.

As can be seen from FIG. 1, the acceleration section B1 is divided into four subsections T11, T12, T13, and T14 of different lengths. These subsections T11, T12, T13, and T14 are interconnected in an electrically conducting manner. In particular, they are connected such that the same current of the associated converter U1 flows through all of them. Analogously, the acceleration section B2 is divided into two interconnected subsections T21, T22, through which the same current of the associated converter U2 flows.

Figure 3:
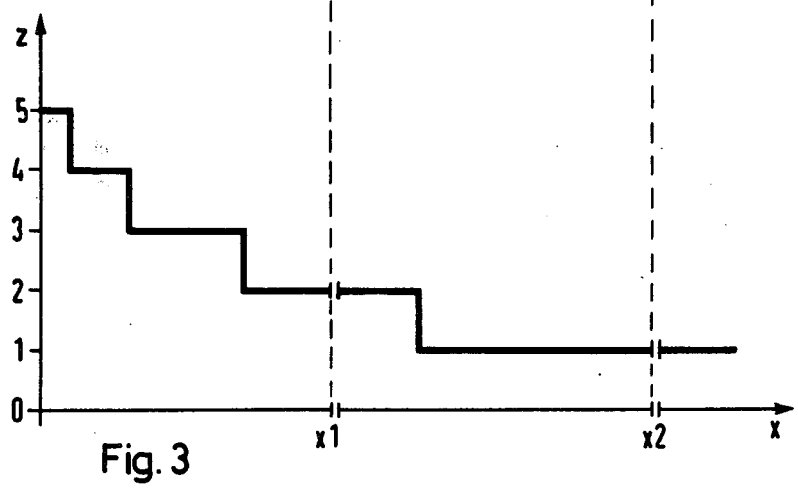
FIG. 3 is a diagram showing the required number of transversal conductors per pole and phase for the subsections of the accelerations sections of FIG. 1 as a function of the location of the subsections along the vehicle path.

In accord with the invention, the number $z$ of transversal conductors per pole and phase is different in the subsections T11, T12, T13, T14 and T21, T22. More specifically, as viewed in the positive acceleration direction, i.e. in the direction of the position axis $x$, the number $z$ decreases by a predetermined mathematical relationship. This relationship states that the number $z$ is at least approximately inversely proportional to the predetermined vehicle velocity $v$, as determined from FIG. 2, in the individual subsections T11, T12, T13, T14 and T21, T22. Selecting the number $z$ in the aforesaid manner ensures that the power in each subsection is optimally matched to its respective feeding converter U1 and U2. An example of the distribution of the number $z$ in the direction of the positive $x$ axis is shown in FIG. 3.

The considerations upon which the relationship governing the selection of the number $z$ are based will now be discussed in detail. To simplify the discussion, let us consider first the case in which the acceleration section B1 is not subdivided and thus has one transversal conductor per pole and phase. The converter U1 supplies the section B1 with a variable frequency and variable ac voltage. As is known, the velocity $v(x)$ of the propulsion vehicle is proportional to the aforesaid frequency of the converter U1. As this frequency is increased, the velocity $v(x)$ varies in accordance with the curve of FIG. 2, reaching its highest velocity $v$ at the end $x1$ of the acceleration section B1.

Let it be also assumed for this case that the propulsion vehicle is to be driven with a constant, maximally attainable thrust F'. As is known, the maximally attainable thrust F' and, since F' = b'm, the maximally attainable acceleration b' at constant vehicle mass $m$ are proportional to the maximum output current I' of the converter U1. Therefore, in order to drive the propulsion vehicle with maximum acceleration b', the converter U1 must deliver its highest allowed output current I'. This is realized via operation of the control unit S1.

As is known, the voltage induced by the exciter in the traveling-field winding is proportional to the velocity $v(x)$ of the vehicle and, hence, is dependent on the vehicle location $x$ between the locations $x = 0$ and $x = x1$. The output voltage U, of the converter U1 is, in turn, proportional to the induced voltage and, therefore, also varies in dependence on the vehicle location $x$ in a manner determined by the given $x/v$ diagram of FIG. 2. Accordingly, the highest output voltage U' delivered by the converter U1 is normally determined by the highest velocity $v$ of the propulsion vehicle when the acceleration B1 section is undivided. The product of highest voltage $U'$ and highest current $I'$ determines the minimum rated power T required per phase, i.e., the power rating for which the converter U1 must be designed as a minimum.

The acceleration power P of the propulsion vehicle is equal to the product of the thrust F and the vehicle velocity $v$, i.e., $P = F \times v(x)$. Therefore, the acceleration power P depends on the vehicle location $x$ and is proportional to the velocity $v(x)$ with the thrust F constant. Analogously, $P' = F' \times v$ corresponds to the maximally attainable acceleration power $P'$. As can be appreciated, the maximum acceleration power $P'$, which equals the above-mentioned minimum rated capacity T, can be delivered by the converter U1, when operating at its highest output current $I'$ and thus with the highest thrust $F'$ only at the vehicle location $X = X1$ at which a vehicle takes on its highest velocity $v^*$. For all other vehicle velocities $v$ in the range from $v = 0$ to $v = v^*$ there is a power mismatch. This means, for example, that at half the value of the highest velocity $v^*$ $v = 0.5v^*$, the converter U1 deliveres only about $0.5\ U'$ and, therefore, only about half the maximum acceleration power $P = 0.5\ P'$ to the propulsion vehicle, neglecting voltage drops at the converter U1. Such a power mismatch means poor utilization of the converter U1 during the acceleration process.

In accordance with invention, it has been recognized that in order to achieve such a power match and good utilization of the converter U1, the acceleration section B1 should be designed so that the voltage U induced in the acceleration section B1 is largely independent of the vehicle velocity $v$ and assumes a value substantially equal to the highest possible voltage. In such case, the acceleration power P will be location-independent and always at a maximum, provided the converter U1, is also operated at its maximally allowed current $I'$ via the control unit S1.

It has been further recognized, in accordance with invention, that the induced voltage U can be made substantially location-independent by ensuring that the number $z$ of transversal conductors per pole and phase of the stator field winding is inversely proportional to the predetermined vehicle velocity $v(x)$ at every vehicle location $x$. Since the induced voltage U is proportional to the number $z$ and to the velocity $v(x)$, selection of $z$ as described aforesaid exactly compensates for the changes in U resulting from the changes in $v(x)$. As a result the induced voltage U will no longer change in the course of the acceleration process, and the converter U1 will always deliver the same acceleration power $P(x)$ at every velocity $v(x)$.

In the ideal case, in order to achieve exact compensation, the number $z$ should be inversely related to the desired or predetermined velocity $v(x)$ at each location $x$, i.e., the characteristic for $z$ should be the inverse or reciprocal of the curve of FIG. 2. However, approximate compensation can be achieved by a stepwise approximation to the inverse characteristic and, hence, a stepwise change in the number $z$. The diagram of FIG. 3 represents such a stepwise approximation to the reciprocal of the curve $v(x)$ in FIG. 2.

As above-indicated, in accord with the invention, the curve of FIG. 3 is realized by dividing the acceleration sections B1, B2 into subsections each of which has a number of transversal conductors per pole and phase equal to the step applicable to its location. Thus, the acceleration section B1 comprises the subsections T11, T12, T13, T14, having, respectively 5, 4, 3, 2 transversal conductors per pole and phase. Analagously, the section B2 comprises subsections T21 and T22 having 2 and 1 transveral conductors per pole and phase. It can be seen, therefore, that the number of transversal conductors per pole and phase of the subsections of a given acceleration section decreases by 1 in going from subsection to subsection. Moreover, in this case the adjacent subsections of the two acceleration sections have the same number of transversal conductors per pole and phase. Alternatively, the number of transversal conductors of the latter adjacent subsections could also differ by 1.

It should be noted that the inclusion of $z$ transversal conductors in a subsection causes the maximally attainable thrust $F'(z)$ and, hence, the maximally attainable acceleration $b'(z)$ therein to now be proportional to the product $zI'$. Thus, the greatest acceleration is imparted to the propulsion vehicle in the first subsection T11, while in the second subsection T12, the acceleration is twice that in the fourth subsection T14. With increasing vehicle distance $x$, the acceleration hence decreases stepwise following the acceleration curve of FIG. 3.

A comparison of the initially considered case in which only one transversal conductor per pole and phase is included in each acceleration section and the present case in which the number follows the step curve of FIG. 3 can be made by reference to FIG. 4. In particular, at a time $t$ after the start ($t = 0$) of the propulsion vehicle, operating with stepwise power matching and, therefore, a higher mean acceleration power $P'$ (upper curve), a higher vehicle velocity $v$ is attained than by operating with maximum thrust $F'$ (lower curve). The acceleration, which is determined by differentiating the curves, is therefore greater in the present case and, as a result, few and relatively short acceleration sections are needed.

FIGS. 5 to 10 illustrate schematically various single-phase winding configurations for the individual subsections of the acceleration sections B1 and B2. More particularly, in FIG. 5 the winding arrangement per pole has a group totaling 5 transversal conductors q aligned parallel to each other. Therefore, such winding arrangement is suited for the first subsection T11. As shown, the groups of 5 transversal conductors q are each aligned parallel to each other and spaced apart by the so-called pole pitch $p$. The output current of the feeding converter flows through two adjacent groups of 5 transversal conductors $q$ in opposite directions at any point in time. The direction of current flow in the conductor at a particular instant of time is indicated by the arrows. This current reverses no later than after one half-period of the output current. By arranging the conductors in this manner, the effective output current in the area of each group is equal to 5 times that of the feeding converter.

The arrangement and distribution of the longitudinal conductors 1 in FIG. 5 is of subordinate importance with regard to the present invention. However, it should be noted that the arrangement shown is particularly advantageous when connecting two winding arrangements having different numbers $z$ of transversal conductors $q$. In the winding arrangement shown, the transversal conductors $q$ of adjacent poles are connected in series via the longitudinal conductors 1 in such a manner that all transversal conductors $q$ are engaged during travel in the acceleration direction $x$. By following the conductor in the direction of the current, it will be found that 2½ left-hand turns are continuously followed by 2½ right-hand turns. The geometric arrangement shown thus corresponds to an outgoing conductor; a separate return conductor is not required for the preferred Y connection of the three phases of the winding.

FIG. 6 shows a winding arrangement comprising 4 transversal conductors $q$ per pole and phase disposed parallel to each other. This arrangement is, therefore, suited for use in the second subsection T12. The geometric arrangement of the conductors is based on the same design principle as employed in the conductor arrangement in FIG. 5. Here, too, the transversal conductors $q$ of adjacent poles are connected in series via the longitudinal conductors l in such a manner that all transversal conductors $q$ are engaged during travel in the acceleration direction $x$. Again, in this arrangement, 2½ right-hand turns are continuously followed by 2½ left-hand turns. As is apparent, in this case four times the output current of the converter is available for acceleration in the area of each group of transversal conductors $q$.

FIGS. 7 and 8 show winding arrangements designed according to the above-described principles and having, respectively, 3 and 2 transversal conductors q per pole and phase disposed parallel to each other. These winding arrangements are suited for the third and fourth subsection T13 and T14, respectively.

FIG. 9 shows another winding arrangement which, like the one in FIG. 8, has a total of $z = 2$ parallel transversal conductors q per pole and phase, through which the same output current flows. The geometric arrangement, however, is such that both the outgoing conductor and the return conductor are bent in meander-fashion. Both the outgoing and the return conductor have transverse conductors q as well as longitudinal conductors l.

Finally, FIG. 10, in comparison therewith, shows a conventional winding arrangement having one transversal conductor q per pole. For the three-phase case, the two other phase conductors are shown, offset by $p/3$ each, dashed and dash-dotted, respectively. This winding arrangement can be employed in the subsection T22.

It may further be seen from FIGS. 5 to 8 and FIG. 10 how the individual winding arrangements can be connected to each other in the single-phase case. More particularly, the terminals of the winding arrangements are designated as $a$ to $f$. On the other hand, the transition points belonging together are similarly identified as $b$ to $e$. To arrive at a configuration in which the subsections T11, T12, T13 and T14 of acceleration section B1 are connected in series and fed by one and the same converter U1, the converter U1 is connected to the terminals $a$ and $e$, and the terminals $b$—$b$, $c$—$c$ and $d$—$d$ are each interconnected.

What is claimed is:

1. A circuit arrangement for use with a trackbound propulsion vehicle which is supplied by a linear synchronous motor having an exciter which is disposed as a co-movable translator on said vehicle, said circuit arrangement including:
   a traveling field winding disposed along the roadbed followed by said vehicle, said winding forming a stator for said motor and having an acceleration span which includes a number of acceleration sections;
   a number of converters each of which supplies one of said acceleration sections with an ac voltage of variable frequency and amplitude; and
   at least one of said acceleration sections including:
      a number of interconnected subsections through which the same current from the converter supplying said one acceleration section flows, each of said subsections having a number of poles and phases and a number of transversal conductors per pole and phase which is inversely proportional to a predetermined velocity of said vehicle in that subsection.

2. A circuit arrangement in accordance with claim 1 in which the number of transversal conductors per pole and phase decreases in moving from subsection to subsection in the acceleration direction of said vehicle.

3. A circuit arrangement in accordance with claim 1 in which in each subsection the transversal conductors of adjacent poles are each connected in series such that all the transversal conductors in that subsection are engaged when said vehicle accelerates therethrough.

4. A circuit arrangement in accordance with claim 1 in which:
   a second one of said acceleration sections adjacent said one acceleration section includes:
      a number of interconnected subsections through which the same current from the converter supplying said second one of said subsections flows, each of said subsections having a number of poles and phases and a number of transversal conductors per pole and phase which is inversely proportional to a predetermined velocity of said vehicle in that subsection; and
   the adjacent subsections of said one and said second one of said acceleration sections have a number of transversal conductors per pole and phase which differ by 1.

5. A circuit arrangement in accordance with claim 1 in which the number of transversal conductors per pole and phase decreases by 1 in moving from subsection to subsection.

6. A circuit arrangement in accordance with claim 1 in which the subsection in which the greatest vehicle velocity is attained as compared to the other subsections has a number of transversal conductors per pole and phase which does not exceed 10.

7. A circuit arrangement in accordance with claim 1 in which the number of acceleration sections is smaller than 5.

* * * * *